United States Patent
Loreille

(10) Patent No.: US 10,969,925 B1
(45) Date of Patent: Apr. 6, 2021

(54) SYSTEM, METHOD, AND COMPUTER PROGRAM FOR GENERATING A THREE-DIMENSIONAL NAVIGABLE INTERACTIVE MODEL OF A HOME

(71) Applicant: Amdocs Development Limited, Limassol (CY)

(72) Inventor: Matthieu Loreille, Opio (FR)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 389 days.

(21) Appl. No.: 15/194,482

(22) Filed: Jun. 27, 2016

Related U.S. Application Data

(60) Provisional application No. 62/185,521, filed on Jun. 26, 2015.

(51) Int. Cl.
| | |
|---|---|
| *G06F 3/0486* | (2013.01) |
| *G06F 3/0481* | (2013.01) |
| *G06T 19/00* | (2011.01) |
| *G06F 3/0484* | (2013.01) |
| *H04L 12/24* | (2006.01) |

(52) U.S. Cl.
CPC ........ *G06F 3/04815* (2013.01); *G06F 3/0486* (2013.01); *G06F 3/04847* (2013.01); *G06T 19/003* (2013.01); *H04L 41/22* (2013.01); *G06T 2200/24* (2013.01)

(58) Field of Classification Search
CPC ....................... G06F 17/5004; G06F 2209/545
See application file for complete search history.

(56) References Cited

U.S. PATENT DOCUMENTS

| | | | |
|---|---|---|---|
| 8,392,852 B2 | 3/2013 | Tokashiki | |
| 2005/0022134 A1* | 1/2005 | Tokashiki | ........... H04L 12/2805 715/764 |
| 2012/0297346 A1* | 11/2012 | Hoffknecht | ............ G05B 15/02 715/850 |
| 2013/0038759 A1* | 2/2013 | Jo | ...................... H04N 5/23293 348/240.99 |
| 2013/0141428 A1* | 6/2013 | Gipson | ............... G06F 3/04815 345/419 |
| 2014/0089859 A1 | 3/2014 | Ishizaka | |
| 2014/0091731 A1* | 4/2014 | Fushimi | ................. H05B 45/10 315/292 |

(Continued)

FOREIGN PATENT DOCUMENTS

| | | |
|---|---|---|
| EP | 1881649 A2 | 1/2008 |
| JP | H11110455 A | 4/1999 |

*Primary Examiner* — Rayeez R Chowdhury
(74) *Attorney, Agent, or Firm* — Zilka-Kotab, P.C.

(57) ABSTRACT

A system, method, and computer program product are provided for generating a three-dimensional navigable interactive model of a home. In use, a plurality of images associated with an area to access in association with a connected home project are received. Further, a three-dimensional model of the area is generated utilizing the plurality of images. Additionally, an indication of a connected home device to associate with a position in the three-dimensional model is received. Furthermore, the connected home device is associated with the position in the three-dimensional model such that a selection of the connected home device utilizing the three-dimensional model will provide access to an application of the connected home device.

18 Claims, 5 Drawing Sheets

(56) References Cited

U.S. PATENT DOCUMENTS

| | | | |
|---|---|---|---|
| 2014/0199649 A1* | 7/2014 | Apte | A61B 1/045 433/27 |
| 2014/0257532 A1* | 9/2014 | Kim | G05B 15/02 700/90 |
| 2015/0007038 A1* | 1/2015 | Sasaki | H04L 12/2803 715/736 |
| 2015/0033136 A1* | 1/2015 | Sasaki | G06F 3/04817 715/736 |
| 2015/0113418 A1* | 4/2015 | Sasaki | G06F 3/04817 715/736 |
| 2015/0220244 A1* | 8/2015 | Vats | G06F 3/04815 715/850 |

* cited by examiner

SYSTEM, METHOD, AND COMPUTER PROGRAM FOR GENERATING A THREE-DIMENSIONAL NAVIGABLE INTERACTIVE MODEL OF A HOME

CLAIM OF PRIORITY

This application claims the benefit of U.S. Provisional Application No. 62/185,521, filed Jun. 26, 2015, the entire contents of which are incorporated herein by reference.

FIELD OF THE INVENTION

The present invention relates to generating a three-dimensional navigable interactive models of a home or parts of a home to use as an interface to connected home devices.

BACKGROUND

A solution that manages connected home devices, for home automation, security, energy management, etc., should expect a growing number of devices connected at any one time. The most straightforward way to display the devices in a graphical user interface is to order them in a list. However, such a list is no longer the smartest choice because, when the list becomes too long, accessing specific devices becomes cumbersome. There should be a more user friendly way to display such devices, given the graphical capabilities of personal devices (e.g. tablets, smartphones, etc.) to generate images, etc.

There is thus a need for addressing these and/or other issues associated with the prior art.

SUMMARY

A system, method, and computer program product are provided for generating a three-dimensional navigable interactive model of a home. In use, a plurality of images associated with an area to access in association with a connected home project are received. Further, a three-dimensional model of the area is generated utilizing the plurality of images. Additionally, an indication of a connected home device to associate with a position in the three-dimensional model is received. Furthermore, the connected home device is associated with the position in the three-dimensional model such that a selection of the connected home device utilizing the three-dimensional model will provide access to an application of the connected home device.

DETAILED DESCRIPTION

Figure 1:
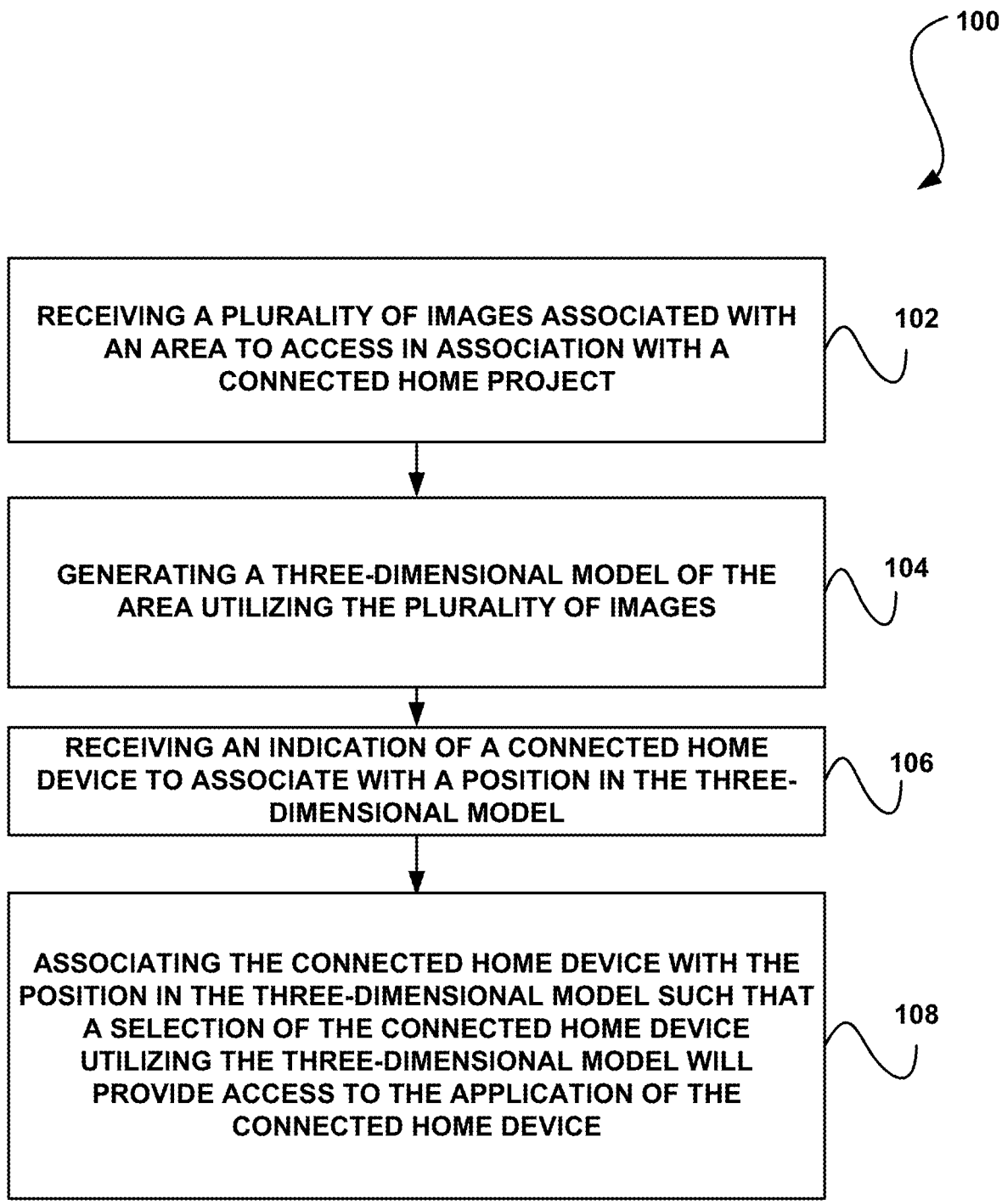
FIG. 1 illustrates a method for generating a three-dimensional navigable interactive model of a home, in accordance with one embodiment.

FIG. 1 illustrates a method 100 for generating a three-dimensional navigable interactive model of a home, in accordance with one embodiment.

As shown, a plurality of images associated with an area to access in association with a connected home project are received. See operation 102. The images may be captured by a mobile device. The mobile device may include, for example, a mobile phone or a tablet computer, etc. The images may be captured as a three-dimensional image of a room, hall, or any other area.

Further, a three-dimensional model of the area is generated utilizing the plurality of images. See operation 104. For example, the images may be stitched together to generate a three-dimensional model using the actual images.

For example, in one embodiment, a user may use a camera (e.g. on a mobile device) that takes pictures as the user moves the camera around and the pictures may be automatically stitched into a three hundred and sixty degree picture.

In another embodiment, a user may use a three hundred and sixty degree camera, which is a camera that may have several wide angle lenses or a single fish eye lens. Such camera can take a three hundred and sixty degree picture by stitching together photos taken synchronously through all of its lenses.

Additionally, an indication of a connected home device to associate with a position in the three-dimensional model is received. See operation 106. For example, a user may select a connected home device from a list of potential connected home devices in a user interface. As another example, the connected home device may be identified automatically utilizing one or more image processing/object recognition algorithms (e.g. implemented by the user device or another system). The connected home device may include any device that accessible via a home network, such as a thermostat, a security device or system, a camera or other sensor, a light switch, a lock, an appliance, etc.

Furthermore, the connected home device is associated with the position in the three-dimensional model such that a selection of the connected home device utilizing the three-dimensional model will provide access to an application of the connected home device. See operation 108. For example, the connected home device may be dragged and dropped from a list in a user interface into a position on the three-dimensional model. As another example, an image processing algorithm may be used to identify the connected home device in the image(s) and, in turn, the position in the image may be associated with the particular device.

In one embodiment, associating the connected home device with the position in the three-dimensional model may include associating application programming interface (API) information associated with the application of the connected home device. For example, the connected home device may be associated with an application for accessing such device (e.g. a proprietary application, etc.). Thus, an interface to that application may be established such that a user can select a representation of the connected home device in the three-dimensional model and access the functionality of that application.

Further, the area may be capable of being explored utilizing the three-dimensional model. For example, clicking on a door in the three-dimensional model may allow a user to virtually exit or enter a current room view and enter another room or hallway, etc. The user may also be able to virtually walk through the model using a mouse, touch, etc.

As another example, clicking on a light switch in the three-dimensional model may allow a user to turn a light associated with the light switch off or on. As yet another example, clicking on a thermostat in the three-dimensional model may allow a user to adjust settings associated with the thermostat. As yet another example, clicking on an appliance in the three-dimensional model may allow a user to adjust settings associated with the appliance. In these cases, in one embodiment, clicking on such devices may cause a user interface with settings and/or power control to pop up on the three-dimensional model.

Thus, the method 100 may be employed to implement a three-dimensional interactive navigation user interface that generates models of houses and/or rooms using images from personal mobile devices.

It should be noted that the method 100 may be implemented utilizing various systems, hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
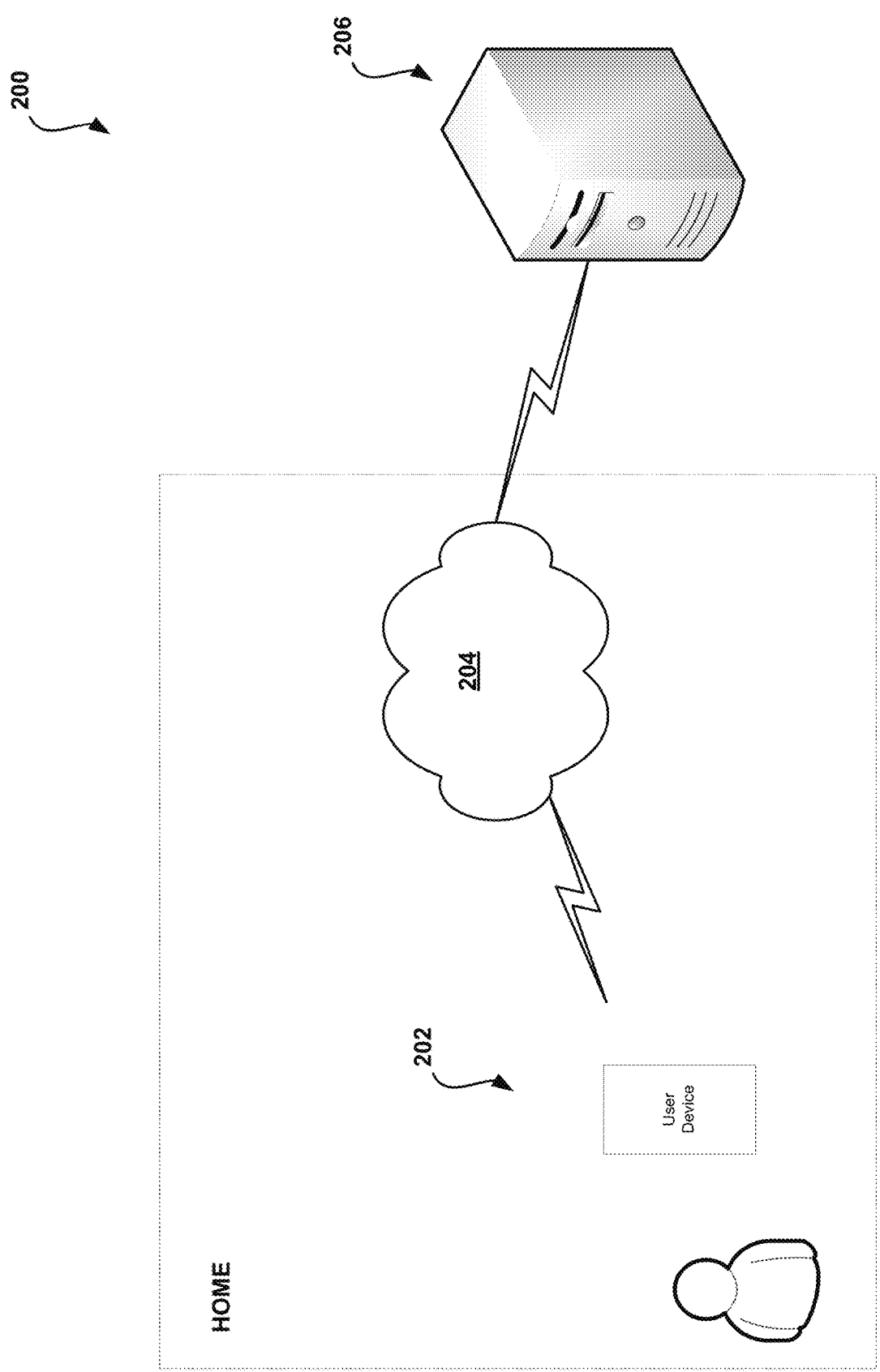
FIG. 2 illustrates a system for generating a three-dimensional navigable interactive model of a home, in accordance with one embodiment.

FIG. 2 illustrates a system 200 for generating a three-dimensional navigable interactive model of a home, in accordance with one embodiment. As an option, the system 200 may be implemented in the context of the details of FIG. 1. Of course, however, the system 200 may be implemented in the context of any desired environment. Further, the aforementioned definitions may equally apply to the description below.

As shown, one or more user devices 202 may be in communication with one or more cloud-based servers/systems 206 over one or more networks 204.

The user device 202 may display a graphical user interface that allows a user to capture views of rooms in a home. For example, several photos taken successively with a smartphone may be combined by digital stitching. A user then has the possibility to place connected home devices in this virtual representation of their home, exactly like they are in their real homes.

Pictures of these devices in the graphical user interface may match the real devices that they represent. This may be used to generate a user configurable interface that can be used to access all connected home devices of a home/business from a single location.

For example, a home connected thermostat may be shown in the generated three-dimensional model (i.e. captured in an image used to create the model). A user may select the thermostat utilizing the user interface (e.g. select a position in the model where the thermostat is placed, etc.). Options for all available home connected devices (e.g. for that particular user, or a library of devices, etc.) may be listed in a section of the user interface (e.g. as an icon, a name, etc.). The user may, for example, drag and drop a representative home device icon from a list to the model and that position in the model may automatically be associated with that device.

Functionally, in one embodiment, an API may be linked to an application of that particular device such that, in operation, when a user is viewing the model and desires to access the device for configuration, etc., the user may click on the item in the image (i.e. the three dimensional model) and the application of the device will be initiated.

In another embodiment, a common connected home device user interface may be initiated in response to the user clicking on a home connected device (in this example a thermostat). This common connected home user interface may present information that would otherwise be presented in the device specific user interface.

In either embodiment, the three dimensional model may be used by a user to virtually 'walk' through a residence and click on home connected devices (which will have an association in the model) such that the user may access the device for configuration, data viewing, and/or any other action that would be allowed on the device specific user interface.

Additionally, a user may switch rooms in a building by, for example, clicking on a door in a room, which will change the view to a hall view, etc.

With further reference to FIG. 2, a plurality of images captured by the user device 202 associated with an area are received. For example, a user may capture a plurality of images of a room. The user device 202 may execute an application that generates a three dimensional model (and thus the images are received by the user device 202) and/or the user device 202 may send the images to the system 206 for model generation.

The system 206 may include various processors, servers, databases, and various software applications. In one embodiment, the system 206 may be associated with a connected home service. The system 206 may include various applications for three dimensional model generation.

A three-dimensional model of the area is generated utilizing the plurality of images. In various embodiments, the user device 202 may generate the model or the system 206 may generate the model.

Additionally, an indication of a connected home device to associate with a position in the three-dimensional model is received. In one embodiment, the system 206 (or the user device 202) may identify the connected home device from the images automatically (e.g. using object recognition technology, etc.).

In another embodiment, a user may use a user interface to identify connected home devices in the images and correlate device information with such devices. For example, using a user interface, the user may select the connected home device in the image and input or select device information to associate with such selected device. The device information may include various information such as the type of device, model number, manufacturer name, a link to firmware information, etc.

Furthermore, the connected home device is associated with the position in the three-dimensional model such that a selection of the connected home device utilizing the three-dimensional model will provide access to an application of the connected home device. In one embodiment, the system 206 may associate the position of the connected home device in the model automatically and store the position information and corresponding connected home device details.

It should be noted that, in various embodiments, the user device 202 may perform some or all of the operations described to be performed by the system 206 in the context of this description. For example, the user device may include an application for performing such operations (along with the appropriate hardware, such as one or more processors, memory, etc.).

Figure 3:
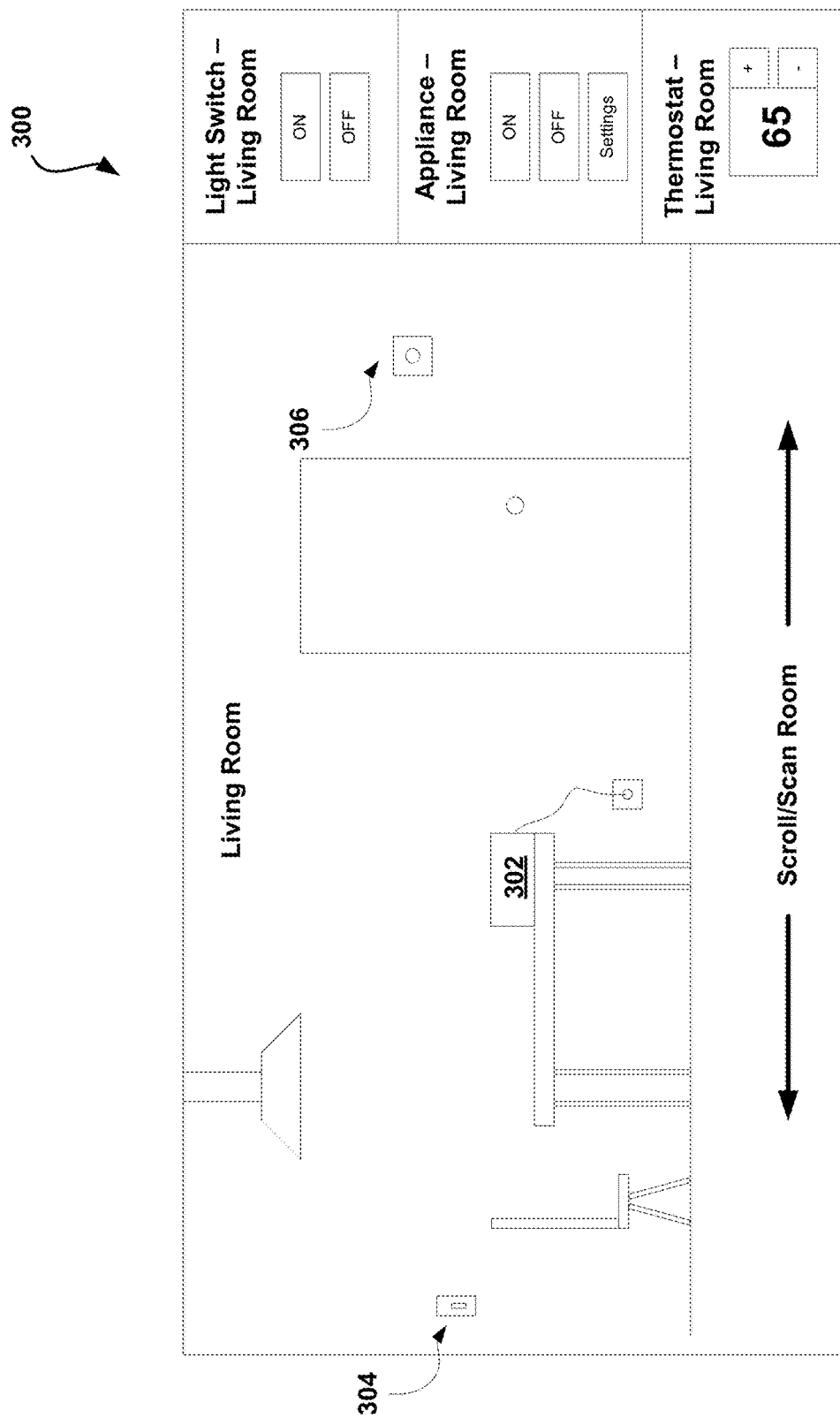
FIG. 3 illustrates a user interface example of a three-dimensional navigable interactive model of a home, in accordance with one embodiment.

FIG. 3 illustrates a user interface 300 example of a three-dimensional navigable interactive model of a home, in accordance with one embodiment. As an option, the user interface 300 may be implemented in the context of the details of the previous figures. Of course, however, the user interface 300 may be implemented in the context of any desired environment. Further, the aforementioned definitions may equally apply to the description below.

Utilizing the user interface 300, actionable devices (i.e. connected home or smart devices, etc.) may be displayed such that users can use the user interface 300 to perform actions associated with such devices.

For example, a user may turn a light on or off by clicking a graphical representation of an ON/OFF switch 304 associated with such device. For example, in one embodiment, a user may select the switch 304 and options to turn a corresponding light on or off may be presented on the user interface 300. In another embodiment, information and options for all actionable devices in a particular view may be presented automatically as the user scrolls through the three dimensional model.

As another example, a user may turn an appliance 302 on or off, or adjust settings, by clicking a graphical representation of the appliance 302. For example, in one embodiment, a user may select the appliance 302 and power and setting options may be presented on the user interface 300.

As another example, a user may select a thermostat 306 and options to set the thermostat may be presented on the user interface 300.

Further, in one embodiment, a three dimensional model representation presented on the user interface 300 may adapt to lighting conditions. For example, if a light is on, the view presented by the user interface 300 may show a brighter room than when the light is off.

Additionally, in one embodiment, the user interface 300 may display measurements gathered from various sensors in a room (e.g. temperature, quality of air, etc.), either as floating digits or with floating icons, etc. In another embodiment, the user interface 300 may be operable such that if a door or a window is open (possibly preventing an alarm system from arming, etc.), the corresponding door or window may be highlighted in the graphical display (e.g. by blinking or a as different color, etc.).

Still yet, in one embodiment, the three dimensional model may be viewable with virtual reality (VR) equipment (e.g. Oculus Rift, Google Cardboard, etc.).

Figure 4:
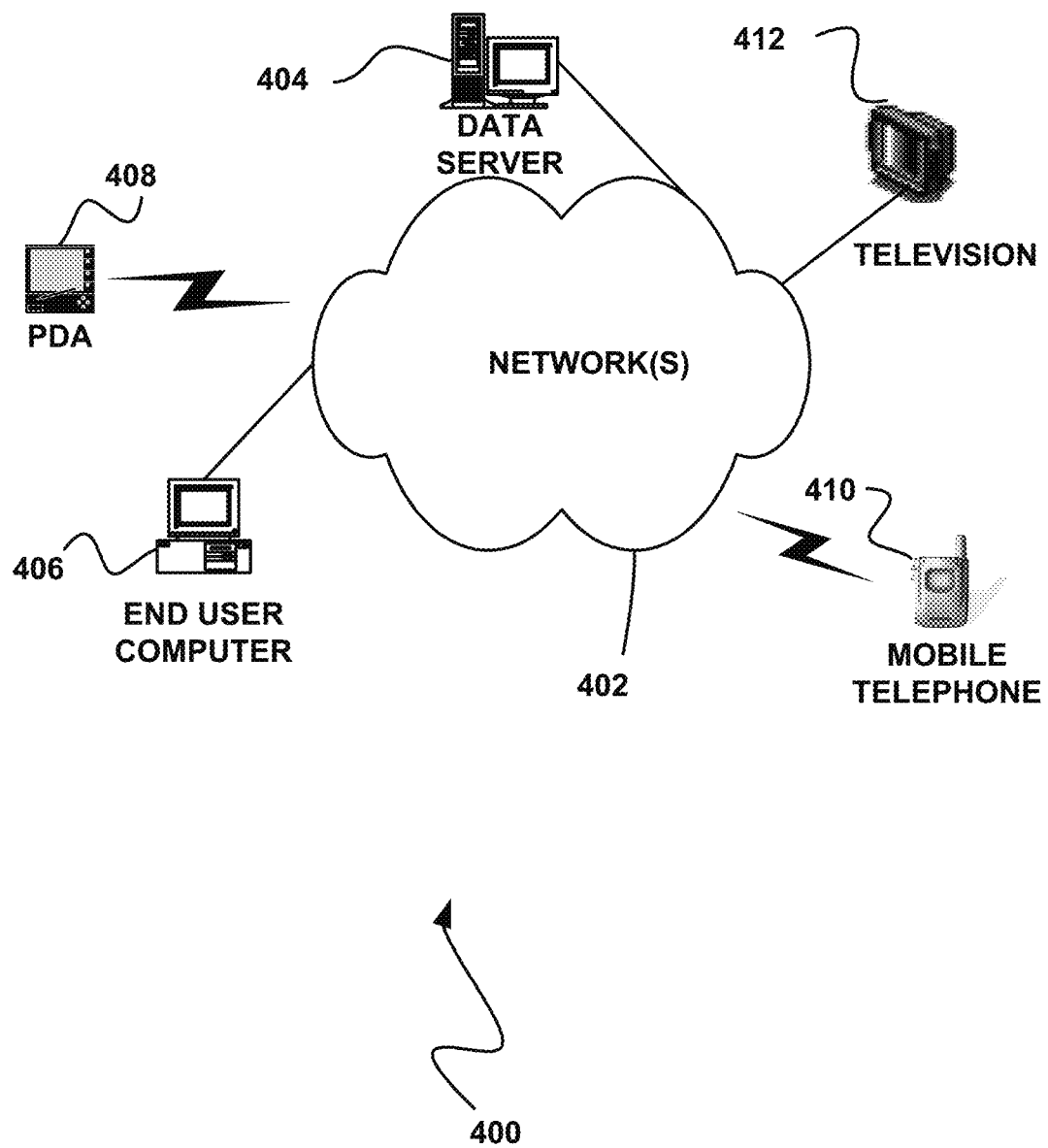
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
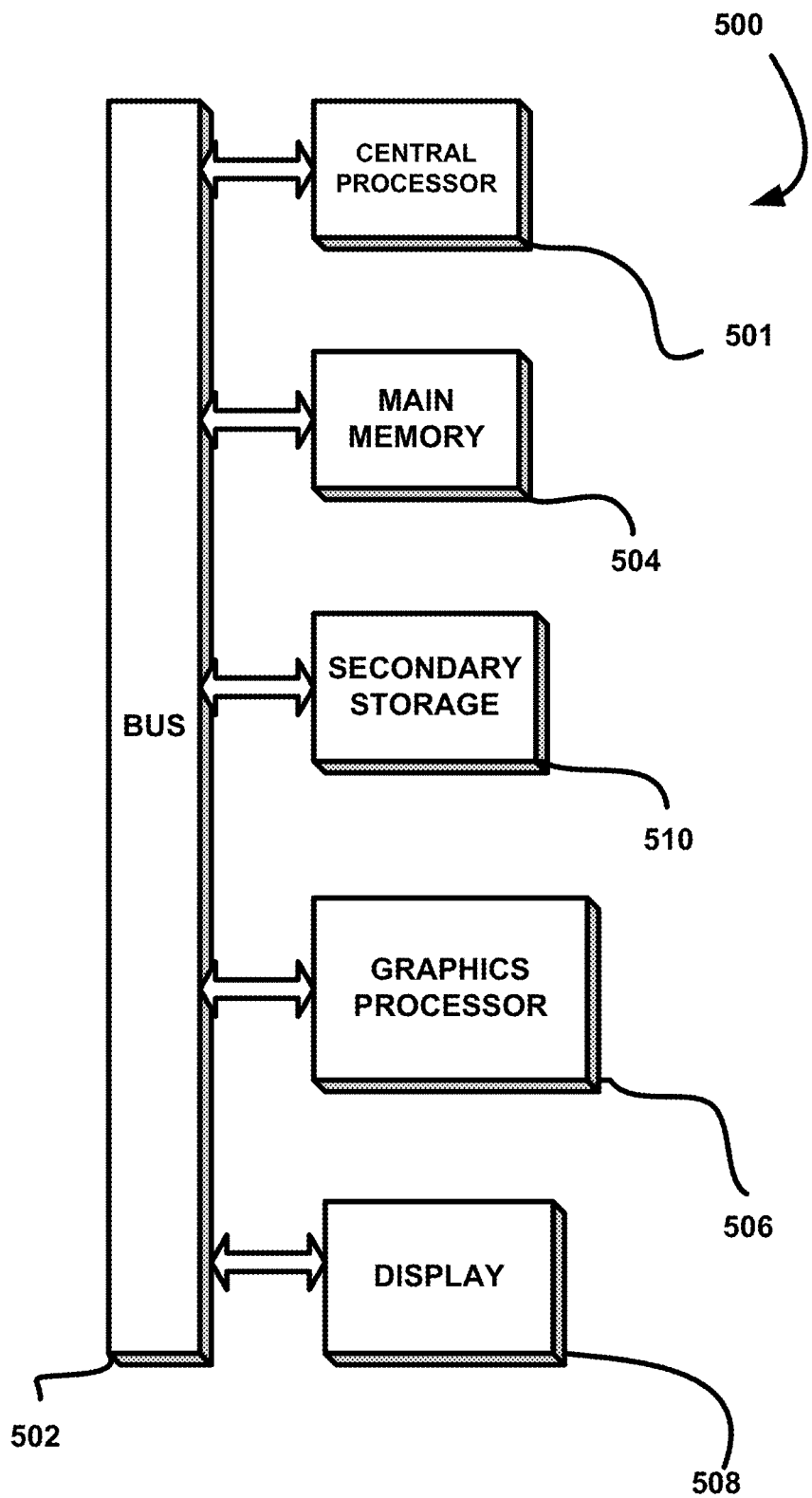
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 504 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 505, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
   receiving, by a system, a plurality of photos of an area to access in association with a connected home project, the plurality of photos captured by a camera;
   stitching the plurality of photos together into a three hundred and sixty degree picture to generate, by the system, a three-dimensional model of the area;
   applying, by the system, an object recognition algorithm to the plurality of photos to identify:
   a first connected home device included at a first particular position in the area;
   including, by the system, a first indicator of the first connected home device in the three-dimensional model, based on the first particular position identified from the object recognition;
   presenting, in a user interface, a list of indicators for potential connected home devices;
   receiving a user selection of an indicator of a second connected home device to include in the three-dimensional model, by the user dragging from the list and dropping in the three-dimensional model a second indicator of the second connected home device at a first particular position in the three-dimensional model;
   associating, by the system, the first indicator of the first connected home device with a first application programming interface (API) associated with a first proprietary application of the first connected home device, such that selection of the first indicator through the three-dimensional model will provide access to the first proprietary application of the first connected home device via the first API;
   associating, by the system, the second indicator of the second connected home device with a second API associated with a second proprietary application of the second connected home device, such that selection of the second indicator through the three-dimensional model will provide access to the second proprietary application of the second connected home device via the second API;
   receiving, by the system, a selection of the first connected home device utilizing the three-dimensional model;
   responsive to the selection, providing, by the system through the three-dimensional model, access to functionality of the first proprietary application of the connected home device via the first API.

2. The method of claim 1, wherein the area is capable of being explored utilizing the three-dimensional model.

3. The method of claim 1, wherein clicking on a door in the three-dimensional model allows a user to virtually exit or enter a current room view.

4. The method of claim 1, wherein clicking on a light switch in the three-dimensional model allows a user to turn a light associated with the light switch off or on.

5. The method of claim 1, wherein clicking on a thermostat in the three-dimensional model allows a user to adjust settings associated with the thermostat.

6. The method of claim 1, wherein clicking on an appliance in the three-dimensional model allows a user to adjust settings associated with the appliance.

7. A computer program product embodied on a non-transitory computer readable medium, comprising computer code for:
    receiving, by a system, a plurality of photos of an area to access in association with a connected home project, the plurality of photos captured by a camera;
    stitching the plurality of photos together into a three hundred and sixty degree picture to generate, by the system, a three-dimensional model of the area;
    applying, by the system, an object recognition algorithm to the plurality of photos to identify:
    a first connected home device included at a first particular position in the area;
    including, by the system, a first indicator of the first connected home device in the three-dimensional model, based on the first particular position identified from the object recognition;
    presenting, in a user interface, a list of indicators for potential connected home devices;
    receiving a user selection of an indicator of a second connected home device to include in the three-dimensional model, by the user dragging from the list and dropping in the three-dimensional model a second indicator of the second connected home device at a first particular position in the three-dimensional model;
    associating, by the system, the first indicator of the first connected home device with a first application programming interface (API) associated with a first proprietary application of the first connected home device, such that selection of the first indicator through the three-dimensional model will provide access to the first proprietary application of the first connected home device via the first API;
    associating, by the system, the second indicator of the second connected home device with a second API associated with a second proprietary application of the second connected home device, such that selection of the second indicator through the three-dimensional model will provide access to the second proprietary application of the second connected home device via the second API;
    receiving, by the system, a selection of the first connected home device utilizing the three-dimensional model;
    responsive to the selection, providing, by the system through the three-dimensional model, access to functionality of the first proprietary application of the connected home device via the first API.

8. The computer program product of claim 7, wherein the area is capable of being explored utilizing the three-dimensional model.

9. The computer program product of claim 7, wherein clicking on a door in the three-dimensional model allows a user to virtually exit or enter a current room view.

10. The computer program product of claim 7, wherein clicking on a light switch in the three-dimensional model allows a user to turn a light associated with the light switch off or on.

11. The computer program product of claim 7, wherein clicking on a thermostat in the three-dimensional model allows a user to adjust settings associated with the thermostat.

12. The computer program product of claim 7, wherein clicking on an appliance in the three-dimensional model allows a user to adjust settings associated with the appliance.

13. A system, comprising one or more processors, for:
    receiving, by the system, a plurality of photos of an area to access in association with a connected home project, the plurality of photos captured by a camera;
    stitching the plurality of photos together into a three hundred and sixty degree picture to generate, by the system, a three-dimensional model of the area;
    applying, by the system, an object recognition algorithm to the plurality of photos to identify:
    a first connected home device included at a first particular position in the area;
    including, by the system, a first indicator of the first connected home device in the three-dimensional model, based on the first particular position identified from the object recognition;
    presenting, in a user interface, a list of indicators for potential connected home devices;
    receiving a user selection of an indicator of a second connected home device to include in the three-dimensional model, by the user dragging from the list and dropping in the three-dimensional model a second indicator of the second connected home device at a first particular position in the three-dimensional model;
    associating, by the system, the first indicator of the first connected home device with a first application programming interface (API) associated with a first proprietary application of the first connected home device, such that selection of the first indicator through the three-dimensional model will provide access to the first proprietary application of the first connected home device via the first API;
    associating, by the system, the second indicator of the second connected home device with a second API associated with a second proprietary application of the second connected home device, such that selection of the second indicator through the three-dimensional model will provide access to the second proprietary application of the second connected home device via the second API;
    receiving, by the system, a selection of the first connected home device utilizing the three-dimensional model;
    responsive to the selection, providing, by the system through the three-dimensional model, access to functionality of the first proprietary application of the connected home device via the first API.

14. The system of claim 13, wherein the area is capable of being explored utilizing the three-dimensional model.

15. The system of claim 13, wherein clicking on a door in the three-dimensional model allows a user to virtually exit or enter a current room view.

16. The system of claim 13, wherein clicking on a light switch in the three-dimensional model allows a user to turn a light associated with the light switch off or on.

17. The system of claim 13, wherein clicking on a thermostat in the three-dimensional model allows a user to adjust settings associated with the thermostat.

18. The method of claim 1, further comprising controlling, via the three-dimensional model, the first connected home device using the functionality of the first proprietary application of the first connected home device accessed using the first API.

* * * * *